(12) United States Patent
Ma et al.

(10) Patent No.: US 8,612,549 B2
(45) Date of Patent: Dec. 17, 2013

(54) MASHUP SERVICE DEVICE AND SYSTEM, AND METHOD FOR ESTABLISHING AND USING MASHUP SERVICE

(75) Inventors: Qifeng Ma, Shenzhen (CN); Xiaomin Shi, Shenzhen (CN); Yan Li, Shenzhen (CN); Jie Tang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 256 days.

(21) Appl. No.: 12/986,822

(22) Filed: Jan. 7, 2011

(65) Prior Publication Data

US 2011/0113470 A1   May 12, 2011

Related U.S. Application Data

(63) Continuation of application No. PCT/CN2009/072583, filed on Jul. 1, 2009.

(30) Foreign Application Priority Data

Jul. 7, 2008  (CN) .......................... 2008 1 0029259

(51) Int. Cl.
*G06F 15/16*   (2006.01)
(52) U.S. Cl.
USPC ............................ 709/219; 709/202; 709/217
(58) Field of Classification Search
USPC .................. 709/202–203, 217–219, 223–224
See application file for complete search history.

(56) References Cited

U.S. PATENT DOCUMENTS

| | | | |
|---|---|---|---|
| 8,453,158 B2 * | 5/2013 | Ma et al. ................. | 709/217 |
| 8,484,611 B2 * | 7/2013 | Bouillet et al. .......... | 717/105 |
| 2004/0015567 A1 | 1/2004 | Ziebold et al. | |
| 2007/0002840 A1 | 1/2007 | Song et al. | |
| 2008/0014939 A1 | 1/2008 | Chang | |
| 2009/0210481 A1 * | 8/2009 | Fletcher et al. .......... | 709/203 |
| 2009/0287740 A1 * | 11/2009 | Banerjee et al. ......... | 709/223 |
| 2010/0269149 A1 * | 10/2010 | Lee et al. ................. | 709/206 |
| 2011/0066563 A1 * | 3/2011 | Jagadeesan et al. ..... | 705/317 |

FOREIGN PATENT DOCUMENTS

| | | |
|---|---|---|
| CN | 1610444 A | 4/2005 |
| CN | 1992888 A | 7/2007 |
| CN | 100466755 C | 3/2009 |
| CN | 100499883 C | 6/2009 |
| KR | 2007-0009517 A | 1/2007 |
| WO | WO 2007/074216 A1 | 7/2007 |

OTHER PUBLICATIONS

Written Opinion of the International Searching Authority in corresponding PCT Application No. PCT/CN2009/072583 (Oct. 1, 2009).
Extended European Search Report in corresponding European Application No. 09793822.9 (Jun. 8, 2011).

(Continued)

*Primary Examiner* — Bharat N Barot
(74) *Attorney, Agent, or Firm* — Leydig, Voit & Mayer, Ltd.

(57) ABSTRACT

A mashup service terminal, a mashup service server, a mashup service system, a method for establishing a mashup service, and a method for using a mashup service are provided. A user terminal capability is introduced into the mashup service as a service and an information source of a mashup application, so that a user can establish and use the mashup service conveniently and flexibly, and the user experience is improved.

20 Claims, 15 Drawing Sheets

(56) References Cited

OTHER PUBLICATIONS

Ma et al., "Mobile Terminal—Capability Management for Services Enabling," State Key Lab of Networking and Switching Technology, 2006, Institute of Electronic and Electrical Engineers, Beijing, China.

Saghir et al., "A New Framework for Indicating Terminal Capability in the IP Multimedia Subsystem," 2006, Institute of Electronic and Electrical Engineers, Geneva, Switzerland.

Wang et al., "Mashup technology and network learning," E-education Research, 2008 (3): 63-66, 71 (Mar. 2008).

International Search Report in corresponding PCT Application No. PCT/CN2009/072583 (Oct. 1, 2009).

\* cited by examiner

MASHUP SERVICE DEVICE AND SYSTEM, AND METHOD FOR ESTABLISHING AND USING MASHUP SERVICE

CROSS-REFERENCE TO RELATED APPLICATIONS

This application is a continuation of International Application No. PCT/CN2009/072583, filed on Jul. 1, 2009, which claims priority to Chinese Patent Application No. 200810029259.3, filed on Jul. 7, 2008, both of which are hereby incorporated by reference in their entireties.

FIELD OF THE INVENTION

The present invention relates to the field of communications, and in particular, to a mashup service device, a mashup service system, a method for establishing a mashup service, and a method for using a mashup service.

BACKGROUND OF THE INVENTION

A mashup service is a Web-based data integration application, which stacks and mashes up a plurality of different applications supporting a Web Application Programming Interface (Web API) to form a Web application. The mashup service establishes a service by utilizing contents retrieved from an external data source, combines contents from different data sources, and establishes more value-added services. The current mashup service is mainly focusing on which sub-services and resources can be used to combine a new application on the Web.

In the conception of the present invention, the inventors found out that conventional systems have at least the following drawbacks. A current mashup service server is a Web integration platform, which can integrate data and functions from different application program each having a Web interface, and can only provide a service and an information source of a mashup application for a user according to relevant Web services and relevant network services on the network, while the capability of a terminal cannot serve as the service and the information source of the mashup application. Especially, currently, with continuous evolution of the network and terminal technologies, various terminals are equipped with relevant software and hardware capabilities, such as a Global Positioning System (GPS), a camera, a radio, and a relevant sensor, but the mashup service server cannot visit and control the capabilities of the terminals.

SUMMARY OF THE INVENTION

In view of the above, it is necessary to introduce a terminal capability into a mashup service as a service and an information source of a mashup application, so that a user can establish and use the mashup service more conveniently.

In an embodiment, the present invention provides a mashup service terminal, where the terminal includes:
 a terminal capability information module, configured to describe a terminal capability of the mashup service terminal and generate description information of the terminal capability; and
 a terminal capability agent module, configured to schedule the terminal capability according to a call request for the terminal capability from a mashup service server, and report the terminal capability to the mashup service server, so that the mashup service server generates a capability component of a mashup service by combining the terminal capability, and establishes the mashup service conveniently.

In an embodiment, the present invention further provides a mashup service server, where the server includes:
 an external capability interaction module, configured to acquire a relevant terminal capability, a relevant Web capability, and a relevant telecommunication capability according to a login request of a user;
 a Web capability set module, configured to store description information of the Web capability;
 a telecommunication capability set module, configured to store description information of the telecommunication capability;
 a terminal capability set module, configured to acquire and store capability information of the terminal;
 a capability set module, configured to match a capability set of the terminal according to description information of the terminal capability, the description information of the Web capability, and/or the description information of the telecommunication capability; and
 a mashup service establishment module, configured to receive the login request, and match, according to the capability set, a capability component of a mashup service established by the user.

In an embodiment, the present invention further provides a mashup service system, the mashup service system including: a mashup service client, a mashup service server, and a mashup service terminal, where
 a user logs in the mashup service server through the mashup service client to establish and/or use a mashup service;
 the mashup service server is configured to acquire a terminal capability, a Web capability, and a telecommunication capability of the mashup service terminal corresponding to the user, and match a capability component of the established mashup service for the user; and
 the mashup service client is configured to visit the mashup service server, and establish the mashup service according to the capability component matched by the mashup service server.

In an embodiment, the present invention further provides another method for establishing a mashup service, where the method includes:
 receiving a login request of a mashup service terminal;
 receiving capability information of the mashup service terminal;
 acquiring Web capability information and telecommunication capability information;
 generating a capability component of the mashup service according to the capability information of the mashup service terminal, the Web capability information, and/or the telecommunication capability information; and
 sending the capability component to the mashup service client to establish the mashup service.

Additionally, in an embodiment, the present invention further provides a method for using a mashup service, where the method includes:
 receiving a request for using the mashup service;
 calling capability information of a mashup service terminal according to the request; and
 calling Web capability information and/or telecommunication capability information according to the request.

According to the embodiments of the present invention, at the time of establishing and using a mashup service, a capability of a user terminal is capable of being introduced, and the capability of the user terminal is used as a service and an information source of a mashup service application, so that a user can establish and use the mashup service more conveniently and flexibly, and a service use experience of the user is improved.

DETAILED DESCRIPTION OF THE EMBODIMENTS

Figure 1:
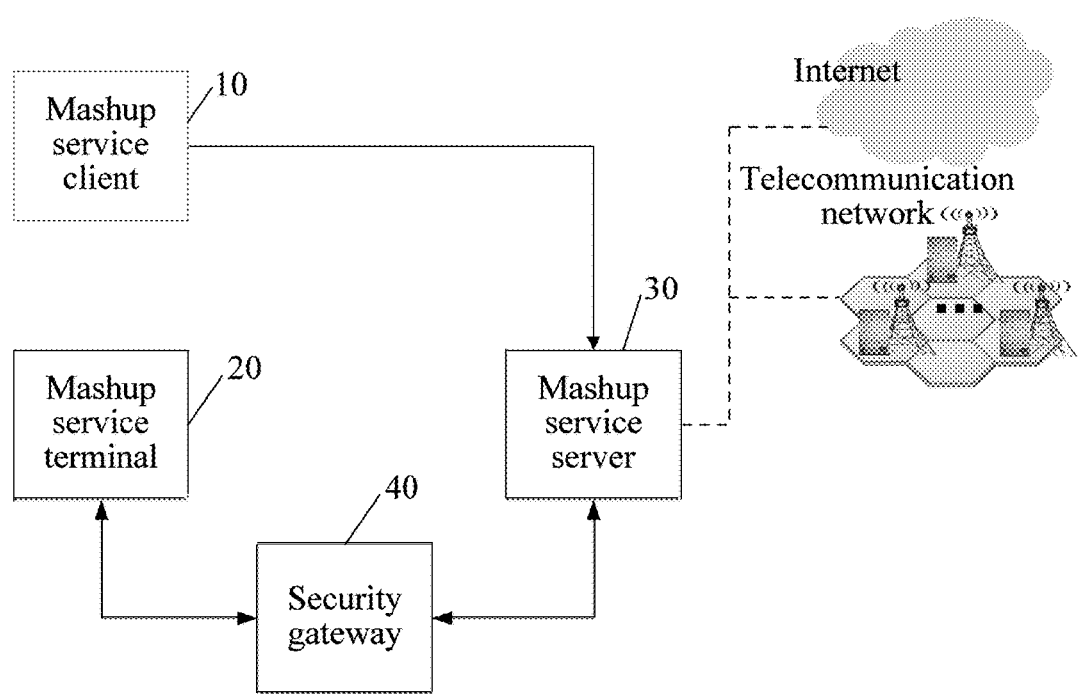
FIG. 1 is a schematic structural view of a mashup service system according to an embodiment of the present invention.

As shown in FIG. 1, according to an embodiment of the present invention, a mashup service system includes a mashup service client 10, a mashup service terminal 20, and a mashup service server 30. The user logs into the mashup service server 30 through the mashup service client 10, so as to establish a mashup service, where a capability of the mashup service terminal 20 is introduced into the mashup service server as an information source for establishing the mashup service, and combines other Web capability and/or telecommunication capability to configure a capability component of the established mashup service for the user, so that the user generates a relevant mashup service satisfying the user's own demands in the mashup service client in different combination manners of the capability component, and the mashup service client can further save information of the generated mashup service. When the user is using the mashup service, the mashup service server 30 can call a corresponding capability of the mashup service terminal 20 and a relevant capability on the Web, so as to bring a richer service experience for the user.

The mashup service system may further include a security gateway 40. The security gateway 40 interacts with the mashup service terminal 20 and the mashup service server 30 respectively, and is configured to exercise security control over establishment and use of the mashup service by the user, so as to ensure security of the mashup service. A main function of the security gateway 40 is to guarantee security of calling the capability of the mashup service terminal 20 by the mashup service server 30. The security gateway 40 is configured to allocate security token information for calling the terminal capability and simultaneously process a discrimination request initiated by the mashup service terminal 20 for the security token information when the mashup service server 30 calls the capability of the mashup service terminal 20. Hence, it is guaranteed that visiting the capability of the mashup service terminal 20 by the mashup service server 30 is always completed in a secure and controllable case. A security token may be generated from a mashup service user token, a password, a mashup service server token and/or corresponding address information and a security gateway token or address, and other relevant additional information through encryption.

The mashup service client 10 is configured to visit the mashup service server 30, which includes establishing the mashup service and using the mashup service. The mashup service client 10 may be independently deployed and run on a computer independent of the mashup service terminal 20, and may also be combined with the mashup service terminal 20 together and run on the mashup service user terminal 20.

The mashup service terminal 20 mainly refers to a terminal device, such as a mobile phone, a personal digital assistant (PDA), and a notebook computer, which is used by the user and can access the network via a wireless network, a mobile network or in a fixed manner. According to the embodiment of the present invention, the mashup service terminal 20 is a user terminal device supporting the mashup service, so that the capability of the mashup service terminal 20 can be introduced in the establishment and use of the mashup service.

Figure 2:
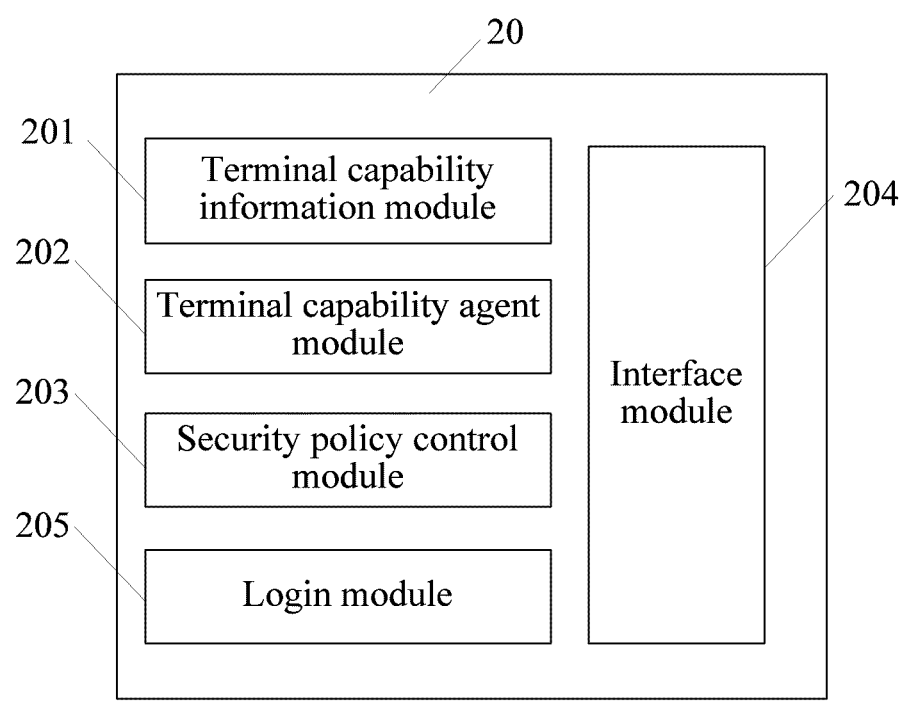
FIG. 2 is a schematic structural view of a mashup service terminal according to an embodiment of the present invention.

As shown in FIG. 2, in an embodiment of the present invention, a mashup service terminal 20 includes a terminal capability information module 201 and a terminal capability agent module 202. The mashup service terminal according to the embodiment of the present invention is described in detail hereinafter with reference to FIG. 2.

The terminal capability information module 201 describes the capability of the terminal and generates terminal capability description information, the terminal capability description information includes information such as software capability information, hardware capability information, and relevant input/output capability information, and the mashup service server can correctly obtain information such as information of a specific capability which the mashup service terminal is equipped with and input/output information corresponding to each capability through the terminal capability description information.

For the capability description information of the mashup service terminal such as an intelligent mobile phone, the mobile phone is attached with a GPS positioning function, a camera function, an alarm function, and a personal calendar function provided by a mobile phone system, and information of these terminal capabilities can be described in the following manner.

```xml
<?xml version="1.0" encoding="UTF-8"?>
<TerminalCapability>                //terminal capability list
<Function = "GPS">                  //GPS function
<Output>                            //output
<parameter="lagitude" type="xsd:string"/> //parameter: latitude type: string
<parameter="longitude" type="xsd:string"/>//parameter: longitude type: string
</Output>                           //output
</Function>
//the paragraph of texts describes the GPS function, and the following text description
is similar to the foregoing and is not specifically explained any more.
        <Function = "Camera">
<Output>
<parameter="2dimensionsbarcode" type="xsd:string"/>
</Output>
</Function>
//the paragraph of texts describes the camera function.
        <Function = "Alarm">
<Input>
<parameter="period" type="xsd:string"/>
</Input>
</Function>
//the paragraph of texts describes the alarm function.
        <Function = "Personal">
<Output>
<item>
<parameter="date" type="xsd:string"/>
<parameter="time" type="xsd:string"/>
<parameter="event" type="xsd:string"/>
<parameter="venue" type="xsd:string"/>
</item>
</Output>
</Function>
</TerminalCapability>
//the paragraph of texts describes the personal calendar function.
```

The terminal capability agent module 202 uniformly schedules a relevant capability of the mashup service terminal 20, and uniformly converts result information fed back for different terminal capabilities, and reports to the mashup service server 30. When the terminal capability agent module 202 is capable of performing effective collision processing on capability call of the mashup service terminal 20, that is, a plurality of requests call a certain specific terminal capability simultaneously, the terminal capability agent module 202 can coordinate the plurality of requests and process them in sequence as requires during practical application, or share result information fed back for the specific terminal capability, that is, a result of one capability call is reported to the corresponding mashup service servers 30 simultaneously as a response of the plurality of requests.

The mashup service terminal 20 may further include a security policy control module 203. In order for security of the capability and the information of the mashup service terminal 20, security control may further be performed on the capability call of the mashup service terminal 20. The security policy control module 203 can mainly support two manners of security control. One manner is confirming a call request by inquiring a Web security gateway, and the other manner is performing a display confirmation by prompting a user through a terminal. The security policy control module can configure the two manners, which may be simultaneously used on the mashup service terminal and cooperate with each other, so as to realize a secure and flexible control mechanism.

The mashup service terminal may further include an interface module 204, which is configured to process an external uniform input and output of the mashup service terminal. The mashup service terminal can access the network in different manners, such as General Packet Radio Service (GPRS), 3rd Generation (3G), Wireless Fidelity (WiFi), or Worldwide Interoperability for Microwave Access (WiMax). The interface module mainly shields a specific physical access manner, and uniformly processes the capability call, result feedback and/or a security control process of the mashup service terminal in an application layer.

Alternatively, during implementation, the mashup service terminal 20 may also log in the mashup service server 30 as the mashup service client 10 to establish and use the mashup service. At this time, according to the embodiment of the present invention, the mashup service user terminal 20 further includes a login module 205, which is configured to log in the mashup service server to establish the mashup service.

Figure 3:
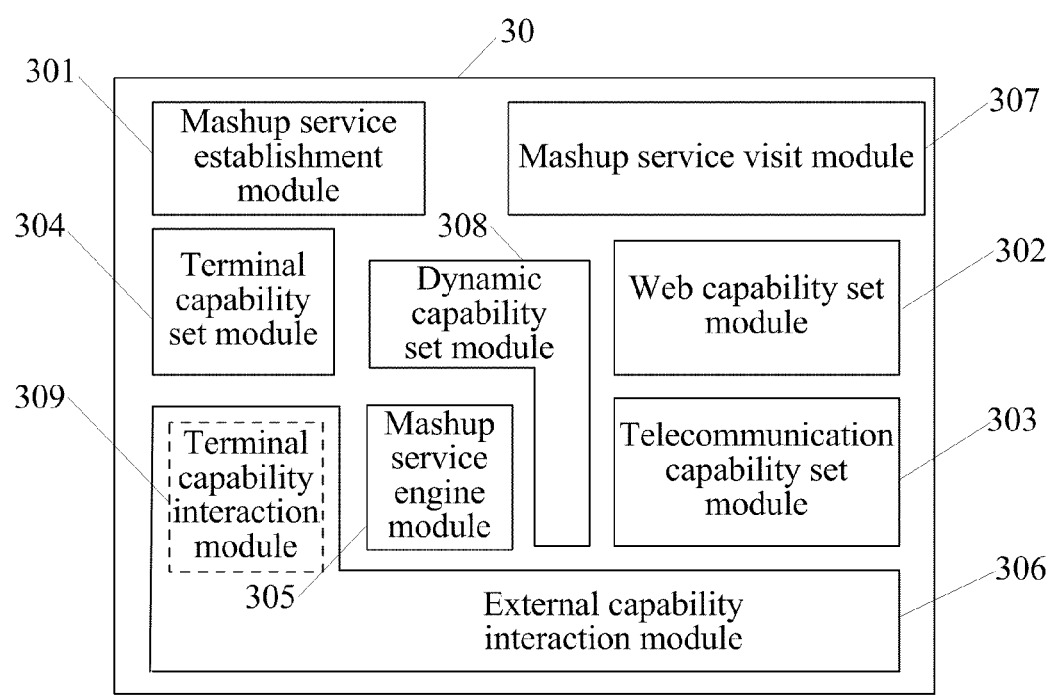
FIG. 3 is a schematic structural view of a mashup service server according to an embodiment of the present invention.

As shown in FIG. 3, in an embodiment of the present invention, a mashup service server includes a mashup service establishment module 301, a Web capability set module 302, a telecommunication capability set module 303, a terminal capability set module 304, a mashup service engine 305, and an external capability interaction module 306. The mashup service server according to the embodiment of the present invention is described in detail hereinafter with reference to FIG. 3.

The mashup service establishment module 301 provides a service establishment environment for a user. After the user logs in the mashup service server 30 through a mashup service client 10, the mashup service establishment module 301 configures a capability component of a mashup service established by the user according to available Web, telecommunication capability set, and capability information of an available terminal of the user, and the user generates a relevant mashup service satisfying his/her demands in different combination manners of the capability component of the established mashup service, and saves the mashup service information (such as a service name and/or a mashup service logic script). The mashup service information may be saved in the mashup service engine 305, and subsequently, the established mashup service may be executed through the mashup service engine 305. The capability information of the available terminal of the user is capability information of a visible terminal of the user, and the capability information of the visible terminal of the user includes capability information of a terminal of the user, capability information of a terminal of another person used by the user from authorization of the another person, and capability information of a terminal preset by a system.

The mashup service server 30 may further include a mashup service visit module 307. After the user establishes the mashup service, the mashup service is saved on the mashup service server 30, that is, saved in the mashup service engine 305. When the user is using the established mashup service, the mashup service visit module 307 delivers the mashup service to the mashup service engine 305 for execution according to mashup service information submitted by the user, such as the service name and/or the mashup service logic script, and the mashup service visit module 307 may further return an execution result to the user as a feedback.

The terminal capability set module 304 is configured to acquire the capability information of the mashup service terminal 20, and may further store the capability information for the user to use at the time of establishing the mashup service. Specifically, the terminal capability set module 304 acquires the capability information of the mashup service terminal 20 by interacting with the mashup service terminal 20, and may acquire the capability information of the mashup service terminal 20 by interacting with the terminal capability agent module 202 or the interface module 204.

The Web capability set module 302 is configured to acquire description information of an available Web capability of the mashup service server 30. The description information of the Web capability may be configured and managed according to Web application information on the Internet. A description for the Web capability may be obtained with reference to the prior art, and is not recited here. The description information of the Web capability may be actively acquired by the Web capability set module 302, and may also be obtained in other manners. Definitely, the acquired description information of the Web capability may also be further stored, and provided to the mashup service server 30 when needed by the mashup service server 30.

The telecommunication capability set module 303 is configured to provide description information of an available telecommunication capability (such as a multimedia message function) of the mashup service server 30. The description information of the telecommunication capability can be configured and managed according to telecommunication capability information of the network. The description information of the telecommunication capability may be actively acquired by the telecommunication capability set module 303, and may also be obtained in other manners. Definitely, the acquired description information of the telecommunication capability may also be further stored, and provided to the mashup service server 30 when needed by the mashup service server 30.

A dynamic capability set module 308 is configured to match an available set of all capabilities for the user according to description information of various capabilities in the terminal capability set module 304, the Web capability set module 302, and the telecommunication capability set module 303. The mashup service establishment module 301 uses capability information in the capability set to establish the mashup service, that is, the mashup service establishment module 301 may configure an available component of the mashup service established by the user according to information in the dynamic capability set module 308.

The external capability interaction module 306 is responsible for calling an external specific Web service, an open capability interface of a telecommunication network, and a terminal capability.

The mashup service server 30 may further include a terminal capability interaction module 309. The terminal capability interaction module 309 may be located in the external capability interaction module 306. The terminal capability interaction module 309 is configured to control an interaction process between the mashup service server 30 and the mashup service terminal 20. The interaction process may also be performed indirectly through a function entity of a security gateway 40. In consideration of security, the mashup service terminal 20 may further perform relevant security control processing on a request of the mashup service server 30. When the mashup service server 30 calls the capability of the mashup service terminal 20, the terminal capability interaction module 309 may acquire relevant security token information through the security gateway 40, then combine the security token information in a request message for calling the capability of the mashup service terminal and send the request message to the mashup service terminal 20, and the mashup service terminal 20 performs the security control accordingly. In another manner, the mashup service server 30 directly sends a relevant request message to the security gateway 40, and then the security gateway 40 forwards the message to the mashup service terminal 20, so that the capability of the mashup service terminal is securely visited.

The mashup service engine 305 is an execution environment of the mashup service server 30. After the user establishes the mashup service, the mashup service engine 305 executes the established mashup service. According to service logic, the mashup service engine 305 may call the Web capability, the telecommunication capability and/or the capability of the mashup service terminal respectively through the external capability interaction module 306. Definitely, the mashup service engine 305 may also call the Web capability, the telecommunication capability, and/or the capability of the mashup service terminal from the Web capability set module 302, the telecommunication capability set module 303, and/or the terminal capability set module 304 respectively.

Here, the mashup service engine 305 may also integrate a function of the external capability interaction module 306 to call an external capability, and at this time, the external capability interaction module 306 is substantially one function unit within the mashup service engine 305.

Figure 4:
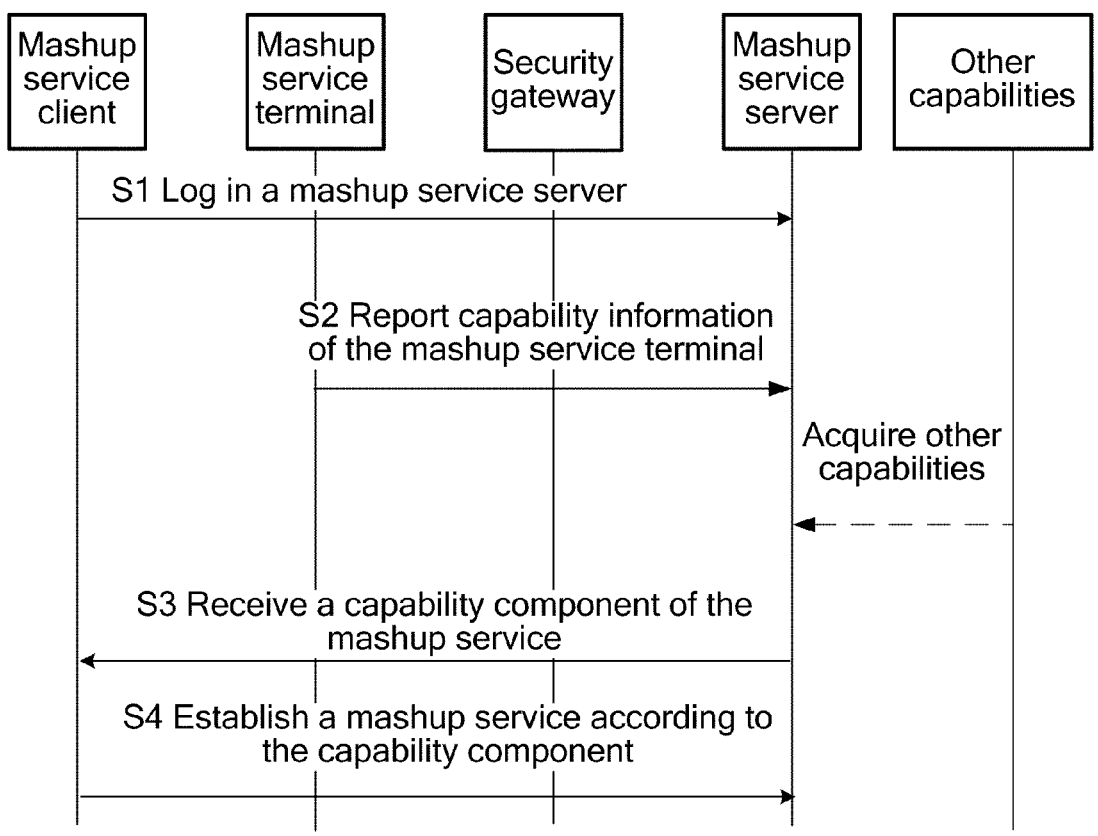
FIG. 4 is a schematic flow chart of a method for establishing a mashup service according to an embodiment of the present invention.

FIG. 4 is a schematic flow chart of a method for establishing a mashup service according to an embodiment of the present invention. In this method, the mashup service is established based on a terminal capability, that is, at the time of establishing the mashup service, a capability of a mashup service terminal is introduced, which includes the following steps.

In step S1, a mashup service server is logged in. A user logs in the mashup service server through a mashup service client, and the user needs to fill in user information (such as a user token) during the login. A user login message may include the user token and terminal access information, such as an access network category and an access service provider.

In step S2, capability information of the mashup service terminal is reported.

In step S2, the mashup service server requests to acquire a capability of the mashup service terminal according to the user login message, and the mashup service terminal reports the capability information of its own to the mashup service server, which includes two cases.

Figure 5:
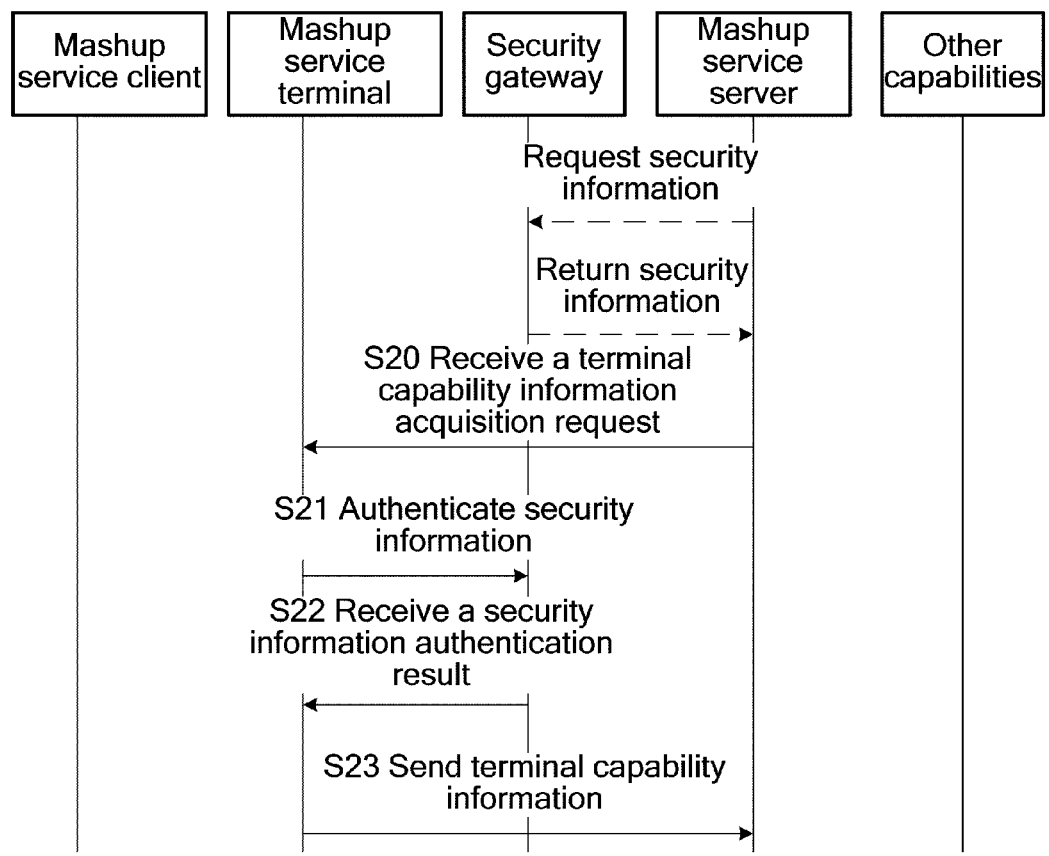
FIG. 5 is a schematic flow chart of step S2 in FIG. 4 according to an embodiment.

A first case is as shown in FIG. 5, and step S2 includes the following steps.

In step S20, the mashup service terminal receives a request sent by the mashup service server for acquiring the capability information of the mashup service terminal, and the request carries security information acquired by the mashup service server from a security gateway. Firstly, a server requests the security information from the security gateway. After receiving a user login request, the mashup service server requests a relevant security gateway to allocate, according to the user token and the terminal access information in the user login request, a security token for visiting a capability of the mashup service terminal corresponding to the user token. In order for the mashup service terminal to discriminate the mashup service server subsequently, a request message needs to include a user token, a password (optional), a token of the mashup service server, and corresponding address information such as an IP address and a Universal Resource Identifier (URI).

According to the user information and information of the mashup service server (such as the user token, the password (optional), the token of the mashup service server, and the corresponding address information such as the IP address and the URI) provided by the mashup service server, the security gateway allocates the security token visiting the capability of the mashup service terminal, and returns the security token to the mashup service server.

Then, the mashup service server carries the security information returned by the security gateway and requests to acquire the capability information of the mashup service terminal. The mashup service server requests a terminal to report the capability information of the mashup service terminal. When the mashup service server requests the mashup service terminal to report, the request message needs to carry information of the security token allocated to the user by the security gateway.

In step S21, the mashup service terminal applies to the security gateway for authenticating the security information carried in a capability request from the mashup service server. After receiving the request message for acquiring the terminal capability from the mashup server, the mashup service terminal requests the security gateway to perform security authentication on the message.

In step S22, the security gateway returns a security information authentication result. After receiving a security authentication request from the terminal, the security gateway performs the security authentication according to the relevant security token and the user information. If authentication is passed, a normal result is returned; if authentication fails, an abnormal result is returned. In the procedure, it is assumed that the authentication is passed. Further, the user may also directly perform security confirmation on this process, that is, steps S22 and S23 can be omitted, while a security policy control module of the mashup service terminal directly prompts the user to perform the security authentication on this visit. If the user passes the security checking, the same processing is performed subsequently.

In step S23, if the authentication is passed, the mashup service terminal returns the capability information of the mashup service terminal to the mashup service server. The mashup service terminal reports the capability information of the mashup service terminal to the mashup service server according to relevant information.

Definitely, the mashup service terminal may also actively report the capability information of the mashup service terminal to the mashup service server, and the specific process is not described in detail any more.

Figure 6:
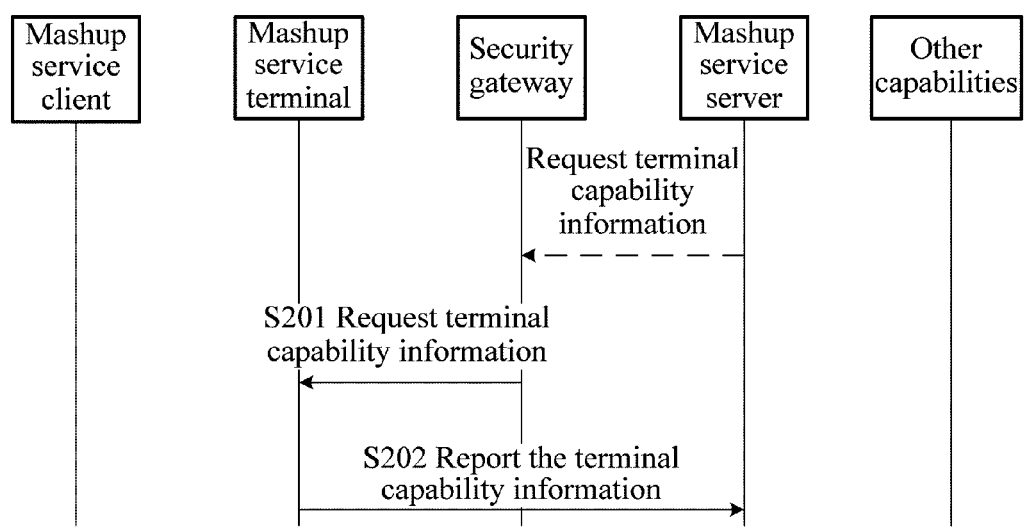
FIG. 6 is a schematic flow chart of step S2 in FIG. 4 according to another embodiment.

A second case is as shown in FIG. 6, and step S2 includes the following steps.

In step S201, the mashup service terminal receives the request for requesting to acquire the capability information of the mashup service terminal from the mashup service server submitted by the security gateway. Firstly, the mashup service server requests to acquire the capability information of the mashup service terminal from the security gateway. After receiving the user login request, the mashup service server directly requests the security gateway to acquire the capability information of the mashup service terminal, and the request message includes the user token, the password, the token of the mashup service server, and the corresponding address information such as the IP address and the URI.

Then, the security gateway requests to acquire the terminal capability information from the mashup service terminal. The security gateway performs the relevant security authentication processing according to the user information provided by the mashup service server, and then forwards the request message added with the security information to the corresponding the mashup service terminal.

In step S202, the mashup service terminal returns the capability information to the mashup service server. The mashup service terminal performs security discrimination on the request message, and then reports the capability of the mashup service terminal to the mashup service server according to relevant information, and a specific message report may be forwarded through the security gateway.

In step S3, a capability component of the mashup service generated by the mashup service server according to the capability information of the mashup service terminal, Web capability information, and/or telecommunication capability information is received. In step S2, the mashup service server acquires the capability information of the mashup service terminal, and then acquires the Web capability information and the telecommunication capability information in step S3. Definitely, here, the steps for acquiring the capability information of the mashup service terminal, the Web capability information, and the telecommunication capability information by the mashup service server may be performed regardless of sequence. The mashup service server generates a corresponding capability component list according to the acquired capability of the mashup service terminal, the acquired Web capability, and the acquired telecommunication capability (such as a GPS function of the mashup service terminal, a map service on Web, and/or a multimedia message capability of telecommunication) and sends the list to the mashup service client, so as to be used by the user to establish the mashup service. For corresponding capability component list, reference may be made to the format of the terminal capability list in the foregoing.

In step S4, a mashup service is established, and the mashup service may be further saved. According to an available capability component list generated by the mashup service server in step S3, the user generates a relevant mashup service satisfying his/her own demands through the mashup service client, and may further save information of the mashup service, such as mashup service name and/or service logic script. The established mashup service may be saved in a mashup service engine of the mashup service server, and subsequently, the mashup service may be executed through the mashup service engine.

In the procedure of establishing the mashup service, the mashup service server knows which available capabilities (such as the GPS function and the multimedia message function) does a mashup service user terminal have by acquiring terminal capability description information of the mashup service user terminal, and then acquires the Web capability (such as the map service) and the telecommunication capability (the multimedia message service) matched with the terminal capability, so as to serve as a reference for establishing a suitable mashup service by the mashup service terminal.

Figure 7:
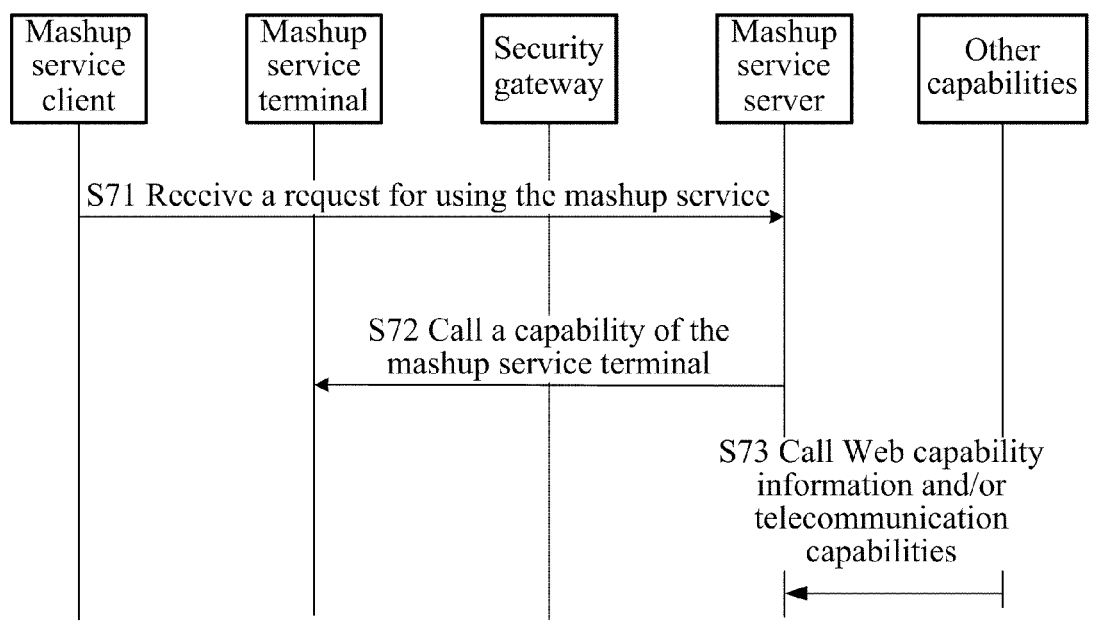
FIG. 7 is a schematic flow chart of a method for using a mashup service according to an embodiment of the present invention.

FIG. 7 is a schematic flow chart of a method for using a mashup service according to an embodiment of the present invention. In the method, use of the mashup service is also based on a terminal capability, which includes the following steps.

In step S71, a mashup service server receives a request for using the mashup service. A user requests to use the mashup service through a mashup service client, and a request message includes user information and access information (such as an access network category and an access service provider) of a mashup service terminal.

In step S72, a capability of the mashup service terminal is called. According to the information carried in the request message of the user, capability information of the mashup service terminal is called.

Step S72 includes two cases as follows.

Figure 8:
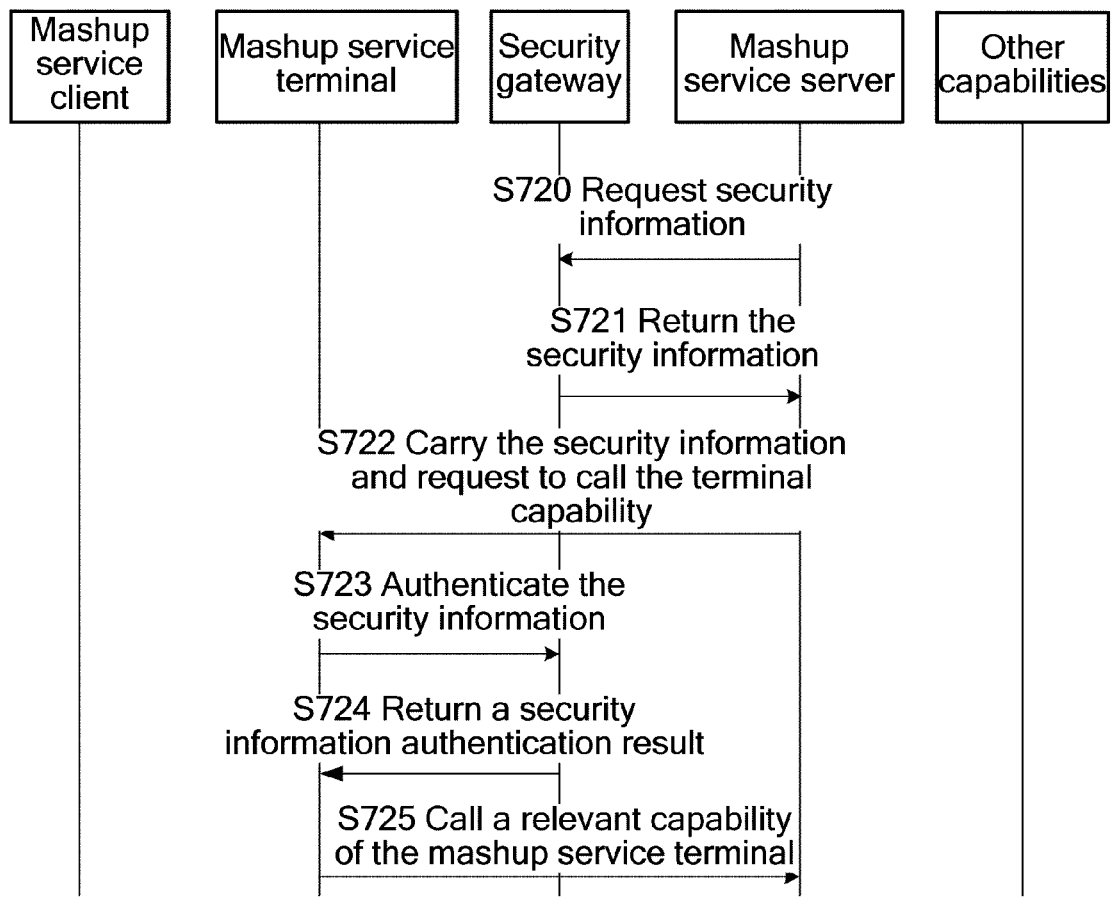
FIG. 8 is a schematic flow chart of step S72 in FIG. 7 according to an embodiment.

A first case is as shown in FIG. 8, and step S72 includes the following steps.

In step S720, the mashup service server requests security information from a security gateway. The mashup service server executes a relevant mashup service according to the request sent by the user. The mashup service server requests a relevant security gateway to allocate security information visiting the capability of the mashup service terminal according to the user information and the terminal access information.

In step S721, the security gateway returns the security information. After receiving the request of the mashup service server, the security gateway performs authentication, generates relevant security token information according to the user information and information of the mashup service server (such as a user token, a password, a token of the mashup service server, and corresponding address information such as an IP address and a URI) provided by the mashup service server, and returns the relevant security token information to the mashup service servers.

In step S722, the mashup service server carries the security information and requests to call the capability of the mashup service terminal. The mashup service server requests to call the capability of the mashup service terminal according to a specific service, and a request message includes security token information allocated by the security gateway.

In step S723, the mashup service terminal applies to the security gateway for authenticating the security information. After receiving a request message for calling terminal capability information, the mashup service terminal requests the security gateway to perform security authentication on the request message.

In step S724, the security gateway returns a security information authentication result. After receiving a security authentication request of the terminal, the security gateway performs the security authentication according to the relevant security token and the user information. If authentication is passed, a normal result is returned; if authentication fails, an abnormal result is returned. In the procedure, it is assumed that the authentication is passed. Further, the user can also directly perform security confirmation on this process, that is, steps S722 and S723 can be omitted, while a security policy control module of the mashup service terminal directly prompts the user to perform the security authentication on this visit. If the user passes security checking, the same processing is performed subsequently.

In step S725, if the authentication is passed, the capability of the mashup service terminal is called. The mashup service terminal calls a relevant terminal capability according to the request message, and may also return result information to the mashup service server. The mashup service server performs subsequent processing, and may call other capabilities.

Figure 9:
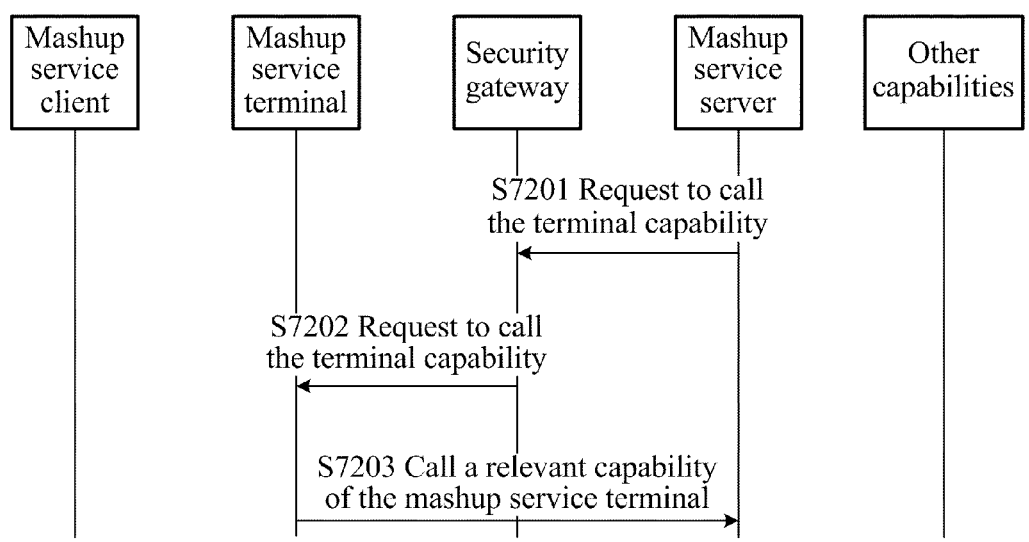
FIG. 9 is a schematic flow chart of step S72 in FIG. 7 according to another embodiment.

A second case is as shown in FIG. 9, and step S72 includes the following steps.

In step S7201, the mashup service server requests to call the capability of the mashup service terminal from the security gateway. The mashup service server executes a relevant mashup service according to the request of the user. The mashup service server sends a request message to a corresponding security gateway according to user information and terminal access information, and the request message needs to include a user token, a password (optional), a token of the mashup service server, and corresponding address information such as an IP address and a URI.

In step S7202, the security gateway requests to call the capability of the mashup service terminal. After receiving a call request for the terminal capability, the security gateway performs security authentication on the message. After the authentication is passed, the message is added with security information, and then is forwarded to a corresponding mashup service terminal.

In step S7203, a relevant capability of the mashup service terminal is called. After receiving the request message, the mashup service terminal calls a relevant terminal capability according to the request message, and returns result information to the mashup service server. A specific returned message may be forwarded through the security gateway, and the mashup service server performs subsequent processing.

In step S73, other Web capabilities and/or telecommunication capabilities are called.

Definitely, steps S72 and S73 may be performed regardless of sequence, and step S73 may also be executed firstly.

In the procedure of using the mashup service, the mashup service server calls the capability (for example, calls the GPS capability of the mashup service terminal to acquire coordinates of a user thereof) of the mashup service terminal and relevant Web capability (such as the map service) and/or telecommunication capability to complete the mashup service, so that it is convenient for the user of the mashup service terminal to use a relevant service.

Figure 10:
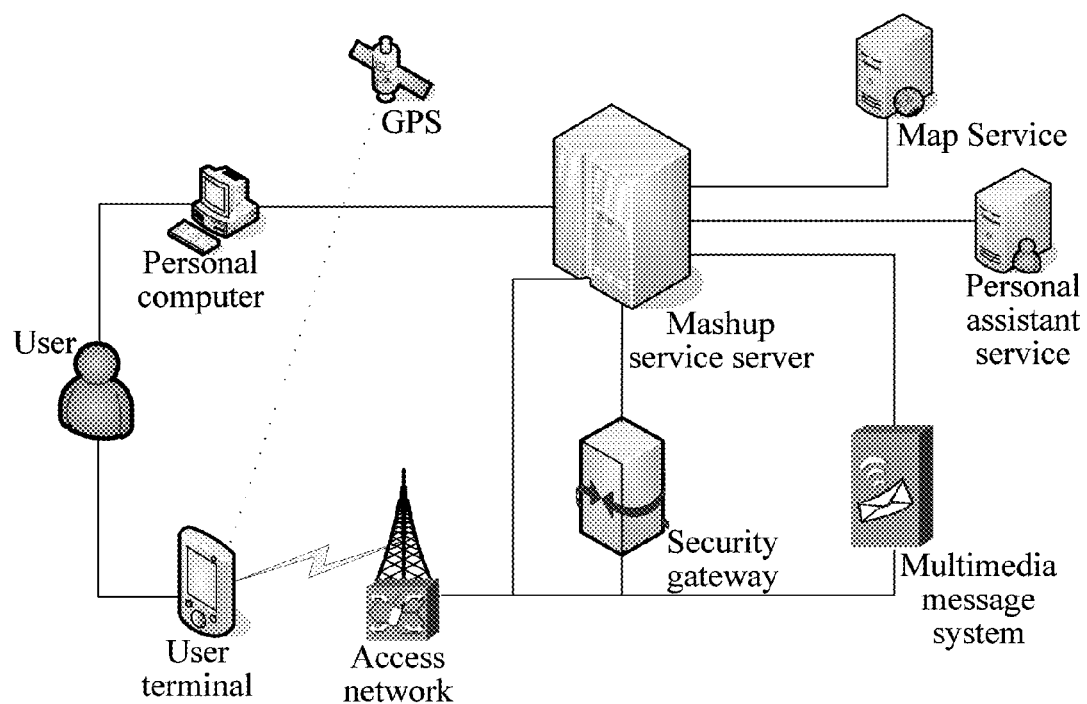
FIG. 10 is a schematic view of an application of a mashup service in a practical network according to an embodiment.

FIG. 10 shows an application of a mashup service in a practical network according to an embodiment. For example, a user possesses an intelligent mobile phone which is attached with a GPS positioning function, a camera function, an alarm function, and a personal calendar function provided by a mobile phone system. Information of these terminal capabilities can be described in the following manner.

```
<?xmlversion="1.0" encoding="UTF-8"?>
<TerminalCapability>                        //terminal capability list
<Function = "GPS">                          //GPS function
<Output>                                    //output
<parameter="lagitude" type="xsd:string"/> //parameter: latitude type: string
```

```
    <parameter="longitude" type="xsd:string"/>//parameter: longitude type: string
  </Output>                                   //output
</Function>
//the paragraph of texts describe the GPS function, and the following text description
is similar to the foregoing, and is not specifically explained any more.
        <Function = "Camera">
  <Output>
  <parameter="2dimensionsbarcode" type="xsd:string"/>
  </Output>
</Function>
//the paragraph of texts describes the camera function.
        <Function = "Alarm">
  <Input>
  <parameter="period" type="xsd:string"/>
  </Input>
</Function>
//the paragraph of texts describes the alarm function.
        <Function = "Personal">
  <Output>
  <item>
  <parameter="date" type="xsd:string"/>
  <parameter="time" type="xsd:string"/>
  <parameter="event" type="xsd:string"/>
  <parameter="venue" type="xsd:string"/>
  </item>
  </Output>
</Function>
</TerminalCapability>
//the paragraph of texts describes the personal calendar function.
```

Figure 11:
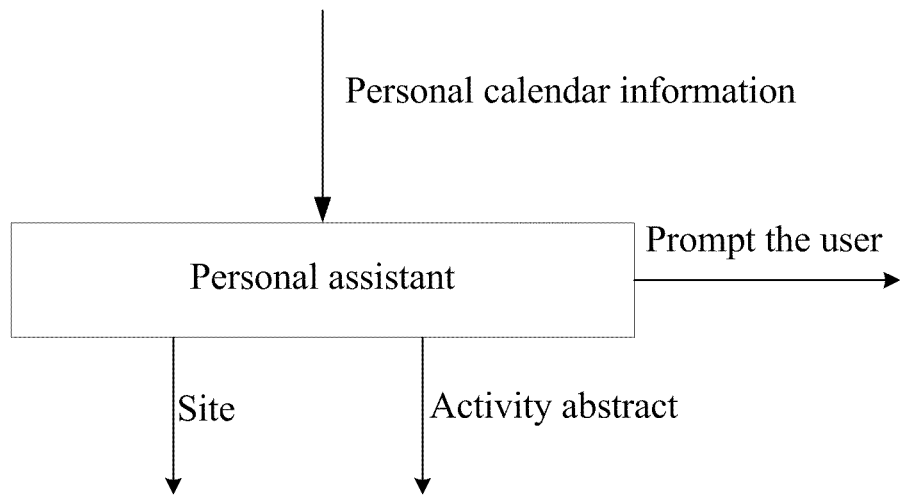
FIG. 11 is a schematic view of simple description for functions of a personal assistant.

A personal assistant service (that is, a Web capability) corresponding to personal calendar information of a user terminal exists on the Internet. As shown in FIG. 11, the service may arrange (prompt) a work (life) activity and a site of the work (life) activity automatically for the user according to personal calendar contents of the user, for example, can reserve an airline ticket and a hotel, and send a prompt or notification mail for the user automatically.

Figure 12:
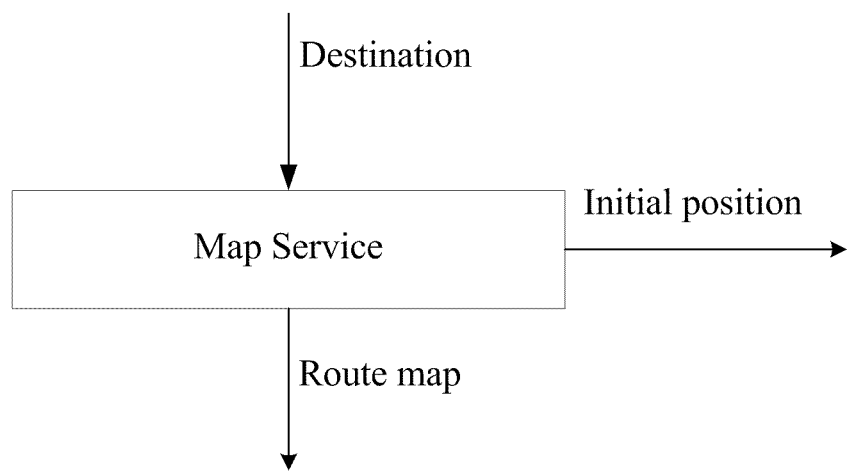
FIG. 12 is a schematic view of a simple description for functions of a Map Service.

Meanwhile, a relevant map service (that is, a Web capability) provided by a service provider exists on the Internet. As shown in FIG. 12, the service may acquire a relevant map according to GPS information, and may automatically plan an optimal route map according to initial and final positions.

Figure 13:
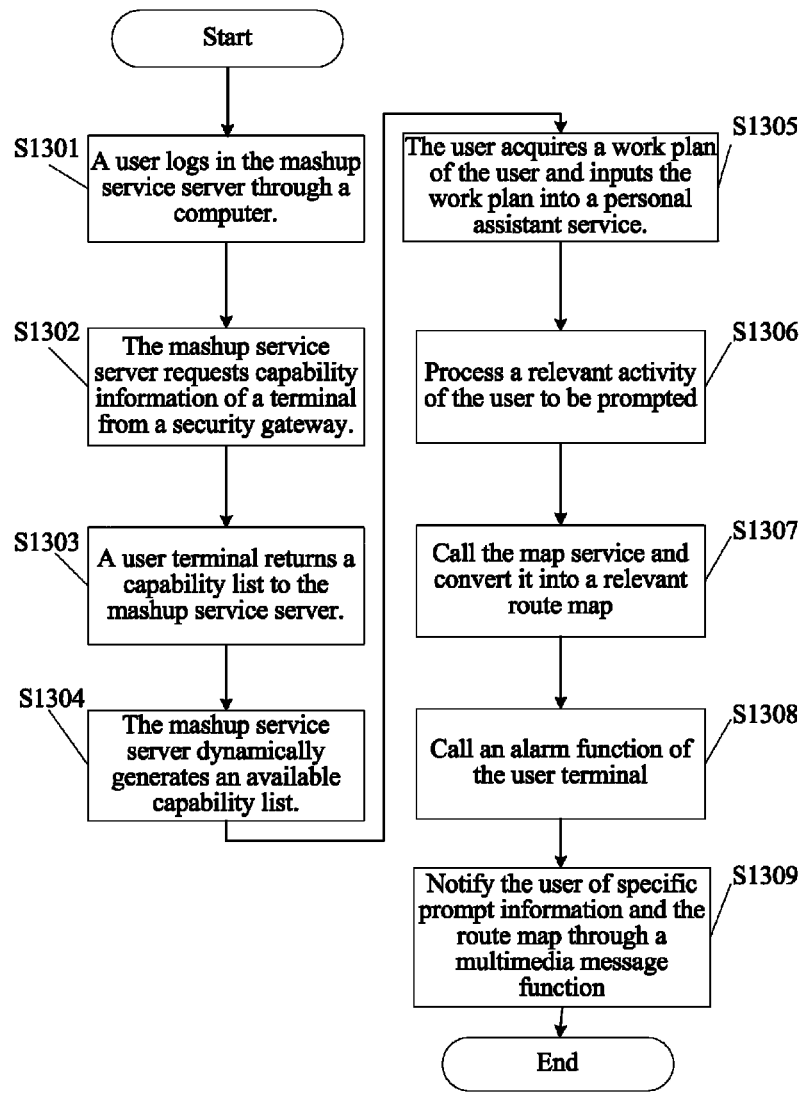
FIG. 13 is a schematic flow chart of a process for establishing a mashup service by a mashup service server according to an embodiment.

Based on the foregoing terminal capability, the service on the Internet, and the multimedia message capability of telecommunication, these functions can be combined into a new application through the mashup service server. It is assumed that the concerned services can all support a Web manner or open visit mechanisms such as SIP, and a user has successfully applied and registered the mashup service server. An establishment environment provided by the mashup service server is used hereinafter to establish the service. Main procedure processing is as shown in FIG. 13, and includes the following steps.

In step S1301, a user visits the service establishment environment of the mashup service server through a computer browser, and inputs relevant information such as user flag and user terminal access.

In step S1302, the mashup service server acquires terminal network information according to user information and terminal access information, and requests capability information of a corresponding terminal from a security gateway of corresponding network information. According to different user terminal networks and capabilities, a specific request message may be sent in manners such as SIP, HTTP, and SOAP.

In step S1303, after receiving a corresponding request, a user terminal performs necessary authentication. If the message is sent directly by the mashup service server, the user terminal requests the user or the security gateway to confirm. After the authentication is passed, the user terminal inquires relevant capability information, and returns a capability list to the mashup service server.

In step S1304, according to the capability information of the terminal, the mashup service server inquires the Web service and the telecommunication network service which the mashup service server is capable of using, and generates an available capability component list (such as GPS, camera, alarm, calendar, personal assistant, and multimedia message). A service establishment module of the mashup service server can show an available mashup service component to the user according to information of these capabilities. The user can arrange and combine these capabilities according to his/her own demands, and establish his/her own mashup service.

In step S1305, in this embodiment, the user firstly acquires a work plan of the user via the calendar capability provided by the user terminal, and inputs the work plan into a personal assistant service as information.

In step S1306, the personal assistant service performs relevant processing according to the work plan of the user, and prompts a relevant activity of the user.

In step S1307, the user can acquire a current user position via a GPS function of the terminal, call the Map Service, and generate route information according to relevant information.

In step S1308, by calling an alarm function of the user terminal, a ringing of 30 seconds is initiated to prompt the user.

In step S1309, activity content and relevant information are sent to the user by calling a multimedia message function through the mashup service server.

So far, establishment of the mashup service by the user based on the GPS, the personal assistant, and so on, is completed.

Figure 14:
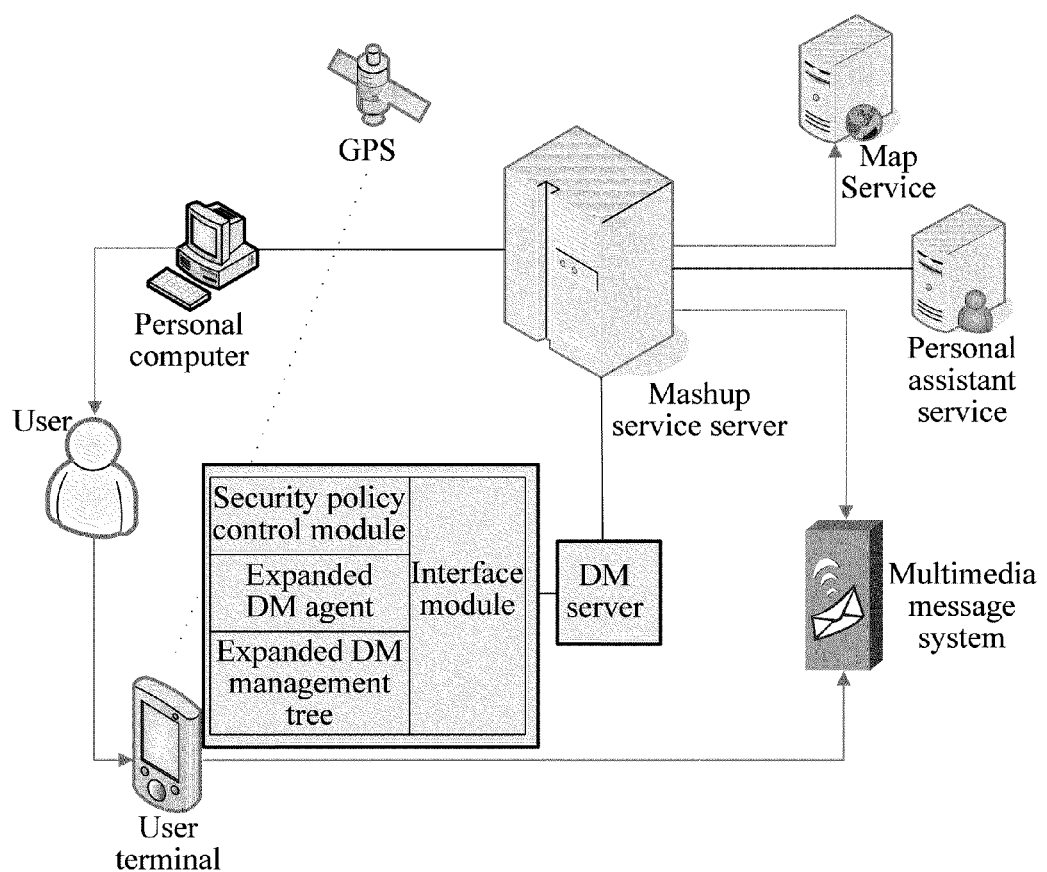
FIG. 14 is a schematic view of an application of a mashup service in a practical network according to an embodiment.

FIG. 14 shows another application of a mashup service in a practical network.

In this embodiment, a user terminal supports a Device Management (DM) function, a terminal capability agent module can be realized via an expanded DM agent function, and terminal capability information can be realized via expanded DM management tree information.

Figure 15:
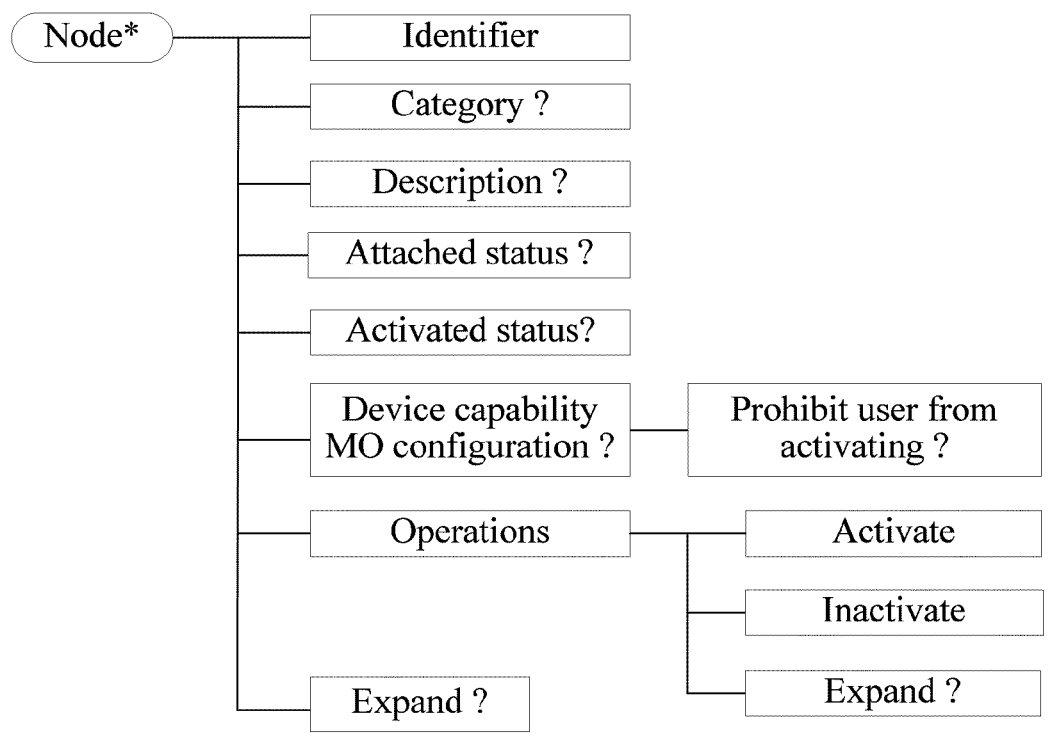
FIG. 15 is a schematic view of a device capability Managed Object (MO) tree.
Figure 16:
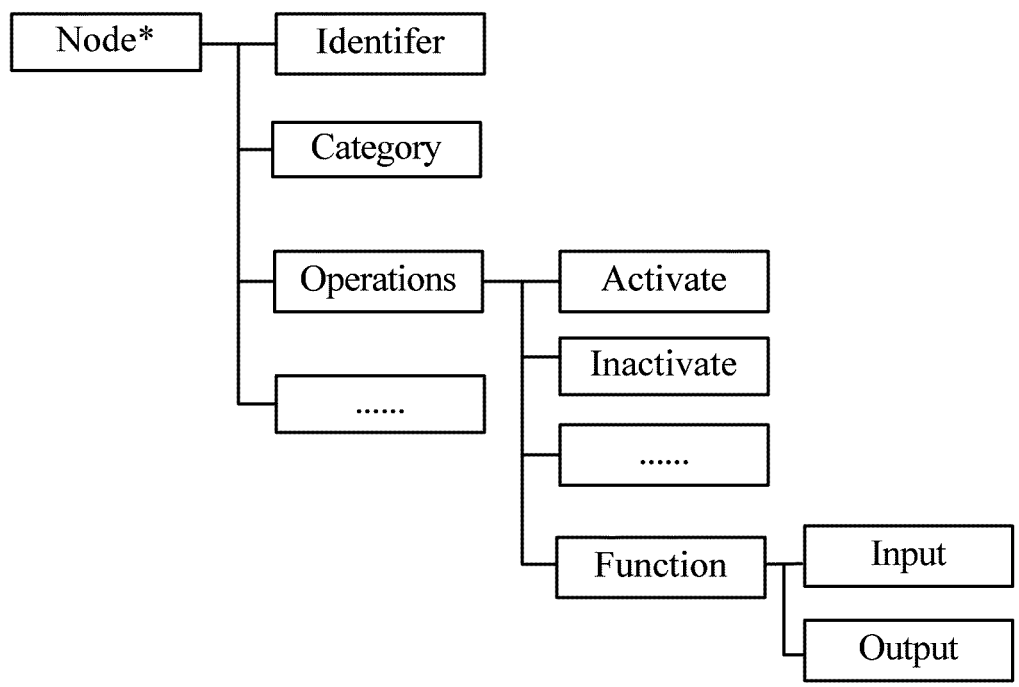
FIG. 16 is a schematic view of an expanded Open Mobile Alliance (OMA) Device Management (DM) device capability MO tree.

A DM related specification of the OMA defines a user terminal device MO. A Device Capability Management Object (DCMO) defines a device capability MO, a main structure of which is as shown in FIG. 15. Relevant characteristics of a device, such as camera, Bluetooth, and keyboard relevant functions are described, Identifier, Category, Description, and Operations can be effectively described, and a DM server can manage a relevant capability of the device in a remote manner through the description mechanism, such as to control statuses (open and close) of the camera. In order to complete the embodiment of the present invention, some expansion can be made on the basis of the foregoing description, and a function call node (FUNC) and an attribute input parameter (Input) and an attribute output parameter are added in the Operations object, so that a relevant result can be acquired by calling the camera function, and the final structure is as shown in FIG. 16.

Text expression manners of specific functions are as follows.

```
<Function = "GPS">
<Input></Input>
<Output>
<parameter="lagitude" type="xsd:string"/>
<parameter="longitude" type="xsd:string"/>
</Output>
</Function>
//the paragraph of texts describes the GPS function.
```

In this way, via FUNC related field information of a device capability object management tree of the DM Server, a mashup service server can acquire information such as terminal capability information capable of being used and categories within which corresponding input and output parameters fall. After the mashup service server acquires the information of these capabilities, the information can be matched with information of other Web services and network services on the mashup service server to generate available mashup service component information for the user. The specific processing process is the same as the application of the mashup service in the practical network in the previous embodiment.

In the process for executing the mashup service, if a user terminal capability needs to be called, the mashup service server can execute a corresponding function in the DCMO through the DM Server. Security information needs to include a user token, a password, and a token or address information of the mashup service server. Specific commands can refer to the following manner.

```
<Exec>
    <CmdID>3</CmdID>
    <Item>
        <Target>
<LocURI>./DCMO/Capability1/Operations/FUNC</LocURI>
        </Target>
        <data>
            <Input> argument </Input>
        </data>
    </Item>
    <Cred>
    <Meta>
    <Type xmlns='syncml:metinf'>syncml:auth-md5</Type>
```

-continued

```
    <Format xmlns='syncml:metinf'>b64</Format>
    </Meta>
    <Data>ZaadivR3yeaaENcRN61dfafdawpAQ==</Data>
    </Cred>
</Exec>
```

After receiving the command, the user terminal performs authentication (according to a relevant policy, or prompt the user to confirm the information of the mashup service server, the user token, and the password), executes a relevant command through an expanded DM agent, and returns a result message to the DM Server, and then the DM Server forwards the result to the mashup service server. Hence, the process for calling the terminal capability by the mashup service server is completed.

Implementation of the present invention has the following beneficial effects.

A user can control his/her own device and data, and is capable of conveniently combining a terminal device capability and data with a relevant function on Web, so as to flexibly generate a mashup application satisfying his/her own demands; and a mashup application engine expands a capability set, being one beneficial supplement to an original mashup service and information source, thus enabling an existing service and information source to play a greater role by introducing a user terminal capability. According to the embodiments of the present invention, the user terminal capability is introduced with respect to the mashup service application as the service and the information source of the mashup application, meanwhile a suitable mashup service information source list is generated for the user via the user information, the user terminal capability, and a relationship between a Web service and a network service, so that a user can establish and use the mashup service more conveniently and flexibly, and a service experience of the user is improved.

Persons of ordinary skill in the art may understand that all or part of the steps of the method according to the embodiments of the present invention may be implemented by a program instructing relevant hardware. The program may be stored in a computer readable storage medium. When the program runs, the steps of the method according to the embodiments of the present invention are performed. The storage medium may be any medium that is capable of storing program codes, such as a Read-Only Memory (ROM), a Random Access Memory (RAM), a magnetic disk, or a Compact Disk Read-Only Memory (CD-ROM).

It should be noted that the above embodiments are merely provided for elaborating the technical solutions of the present invention, but not intended to limit the present invention. Although the present invention has been described in detail with reference to the foregoing embodiments, it is apparent that person having ordinary skill in the art may make modifications to the technical solutions described in the above embodiments, or may make some equivalent replacements to some of the technical properties without making the nature of the corresponding technical solutions depart from the spirit and scope of the various embodiments of the invention.

The invention claimed is:

1. A mashup service terminal, comprising:
a terminal capability information module, configured to describe a terminal capability of the mashup service terminal and generate description information of the terminal capability; and
a terminal capability agent module, configured to schedule the terminal capability according to a call request for the terminal capability from a mashup service server and report the terminal capability to the mashup service server, so that the mashup service server generates a capability component of a mashup service by combining the terminal capability, and establishes the mashup service conveniently.

2. The mashup service terminal according to claim 1, further comprising:
a login module, configured to log in the mashup service server and establish the mashup service according to the capability component of the mashup service.

3. The mashup service terminal according to claim 1, further comprising:
a security policy control module, configured to perform security control on a capability call request of the mashup service terminal from the mashup service server.

4. The mashup service terminal according to claim 2, further comprising:
a security policy control module, configured to perform security control on a capability call request of the mashup service terminal from the mashup service server.

5. The mashup service terminal according to claim 3, wherein the security policy control module confirms the capability call request by inquiring a security gateway or via a user prompt displayed by a terminal.

6. The mashup service terminal according to claim 4, wherein the security policy control module confirms the capability call request by inquiring a security gateway or via a user prompt displayed by a terminal.

7. The mashup service terminal according to claim 1, further comprising:
an interface module, configured to interact with the terminal capability information module and the terminal capability agent module, and process an external input/output.

8. The mashup service terminal according to claim 7, wherein the interface module supports one or more of access manners of General Packet Radio Service (GPRS), 3rd Generation (3G), Wireless Fidelity (WIFI), and Worldwide Interoperability for Microwave Access (WiMax).

9. A mashup service server, comprising:
an external capability interaction module, configured to acquire a relevant terminal capability, a relevant Web capability, and a relevant telecommunication capability according to a login request of a user;
a Web capability set module, configured to store description information of the Web capability;
a telecommunication capability set module, configured to store description information of the telecommunication capability;
a terminal capability set module, configured to acquire and store capability information of the terminal;
a capability set module, configured to match a capability set of the terminal according to description information of the terminal capability, the description information of the Web capability, and/or the description information of the telecommunication capability; and
a mashup service establishment module, configured to receive the login request, and match a capability component of a mashup service established by the user according to the capability set.

10. The mashup service server according to claim 9, further comprising:

a mashup service visit module, configured to call and deliver the established mashup service to a mashup service engine for execution; and
the mashup service engine, configured to execute the established mashup service.

11. The mashup service server according to claim 9, wherein the external capability interaction module further comprises:
a terminal capability interaction module, configured to control an interaction process between the mashup service server and a user terminal.

12. The mashup service server according to claim 10, wherein the external capability interaction module further comprises:
a terminal capability interaction module, configured to control an interaction process between the mashup service server and a user terminal.

13. A mashup service system, comprising:
a mashup service client, a mashup service server, and a mashup service terminal, wherein
the mashup service server is configured to be logged in for a user through the mashup service client to establish and/or use a mashup service;
the mashup service server is configured to acquire a terminal capability, a Web capability, and a telecommunication capability of the mashup service terminal corresponding to the user, and match a capability component of the established mashup service for the user; and
the mashup service client is configured to visit the mashup service server, and establish the mashup service according to the capability component matched by the mashup service server.

14. The mashup service system according to claim 13, further comprising:
a security gateway, configured to perform security control on an establishment and use process of the mashup service.

15. A method for establishing a mashup service, comprising:
receiving, by a mashup service server, a login request of a mashup service terminal;
receiving, by the mashup service server, capability information of the mashup service terminal;
acquiring, by the mashup service server, Web capability information and telecommunication capability information;
generating, by the mashup service server, a capability component of the mashup service according to the capability information of the mashup service terminal, the Web capability information, and/or the telecommunication capability information; and
sending, by the mashup service server, the capability component to the mashup service client to establish the mashup service.

16. The method according to claim 15, wherein the receiving the capability information of the mashup service terminal comprises:
requesting security information from a relevant security gateway according to the login request;
receiving the security information returned by the security gateway;
carrying the security information and requesting to acquire the capability information from the mashup service terminal; and
receiving the capability information sent by the mashup service terminal.

17. The method according to claim 15, wherein the receiving the capability information of the mashup service terminal comprises:

requesting to acquire the capability information of the mashup service terminal from a security gateway; and receiving the capability information sent by the security gateway.

18. A method for using a mashup service, comprising:

receiving, by a mashup service server, a request for using the mashup service;

calling, by the mashup service server, capability information of a mashup service terminal according to the request; and calling, by the mashup service server, Web capability information and/or telecommunication capability information according to the request.

19. The method according to claim 18, wherein the calling the capability information of the mashup service terminal comprises:

requesting, by a mashup service server, security information from a security gateway;

returning, by the security gateway, the security information;

carrying, by the mashup service server, the security information, and requesting to call a capability of the mashup service terminal;

applying, by the mashup service terminal, to the security gateway for authenticating the security information;

returning, by the security gateway, a security information authentication result; and if authentication is passed, calling a relevant capability of the mashup service terminal.

20. The method according to claim 18, wherein the calling the capability information of the mashup service terminal comprises:

requesting, by a mashup service server, to call a capability of the mashup service terminal from a security gateway;

requesting, by the security gateway, to call the capability of the mashup service terminal; and calling a relevant capability of the mashup service terminal.

\* \* \* \* \*